Patented Oct. 28, 1924.

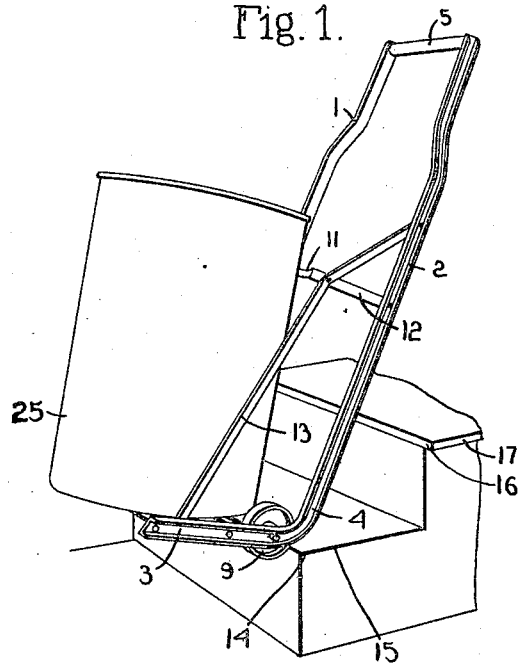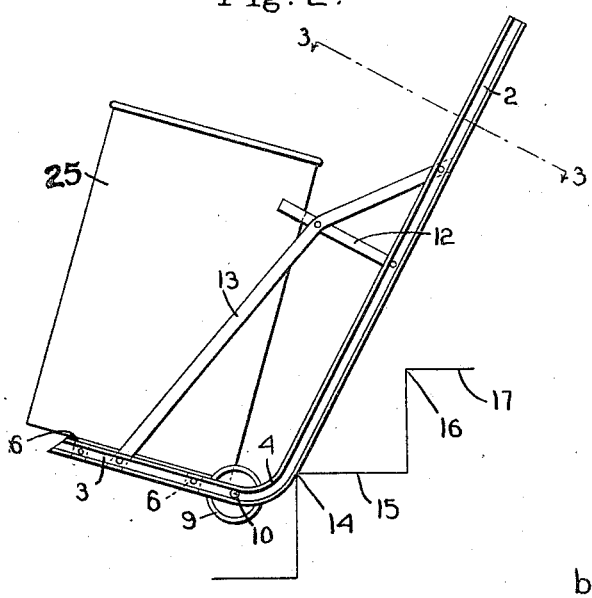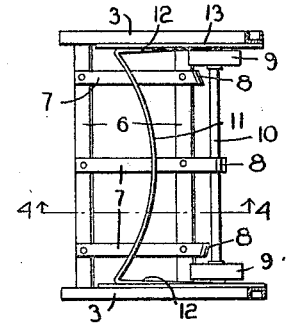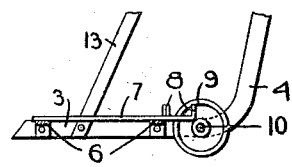

1,513,045

UNITED STATES PATENT OFFICE.

THOMAS E. JORDAN, OF MALDEN, AND GERALD J. HENRY, OF MELROSE, MASSACHUSETTS; SAID JORDAN ASSIGNOR OF HIS ENTIRE RIGHT TO OLIVER WHYTE CO. INC., OF BOSTON, MASSACHUSETTS, A CORPORATION OF MASSACHUSETTS.

BARREL TRUCK.

Application filed September 30, 1919. Serial No. 327,507.

*To all whom it may concern:*

Be it known that we, THOMAS E. JORDAN and GERALD J. HENRY, citizens of the United States, and residents of Malden, county of Middlesex, State of Massachusetts, and Melrose, county of Middlesex, State of Massachusetts, respectively, have invented an Improvement in Barrel Trucks, of which the following description, in connection with the accompanying drawing, is a specification, like characters on the drawing representing like parts.

This invention relates to barrel trucks which are designed for transporting barrels from one place to another and the object of the invention is to provide a novel barrel truck by which a barrel can be transported up and down stairs as well as along a level floor or pavement.

In order to give an understanding of our invention, we have illustrated in the drawing a selected embodiment thereof which will now be described, after which the novel features will be pointed out in the appended claim.

In the drawings, Fig. 1 is a perspective view of a barrel truck embodying our invention showing the manner in which it is used to transport a barrel up a flight of steps;

Fig. 2 is a side view;

Fig. 3 is a section on the line 3—3, Fig. 2;

Fig. 4 is a section on the line 4—4, Fig. 3.

Our improved truck comprises two side members which are bent to form a platform-supporting portion and runner or shoe portions, a platform for supporting a barrel carried by the platform-supporting portion, and truck wheels journaled in the platform-supporting portion of the side members and on which the truck may be trundled over a level surface.

The truck is also provided with a handle portion by which it may be manipulated.

The shape of the side members and the position of the truck wheels therein relative to the runner or shoe portions is such that in transporting the truck up a pair of steps, the shoe portions of the truck will engage and slide up over the nose of the steps, and during this operation the truck wheels do not interfere at all with such movement, but instead rather assist the movement.

The two side members of our improved truck are indicated at 1 and 2, respectively, and may be made of any suitable material. We prefer to use some structural material, such as channel iron. Each of the side members is shaped so as to present the platform-supporting portion 3 at its lower end and the curved runner or shoe portion 4. The upper end of the side members also constitutes a handle portion, said upper ends being connected by a handle 5. The platform-supporting portions 3 of the side members sustain a barrel-supporting platform on which a barrel, ash can or similar receptacle 25 may be sustained. This platform is herein shown as made up of a plurality of cross members 6 which connect the two portions 3 of the side members, and a plurality of longitudinal members 7 which are secured to the cross members 6. The longitudinal members 7 may conveniently be made of strips of strap iron and they are formed at their rear ends with upturned portions 8 which form positioning stops for the barrel or other receptacle 25. The truck wheels on which the truck is supported are indicated at 9. These are journaled on a rod 10 which extends across and is secured in the side members 1 and 2. The truck wheels are journaled in the barrel-supporting portion 3 of the side members and in front of the shoe or runner portion 4. This position of the truck wheels 9 is an important one because it provides for the ready transportation of the truck up and down steps, as will be presently described.

The truck is also provided with a barrel rest 11 which engages the upper end of the barrel and assists in holding it in position on the platform. This barrel rest is curved to fit the barrel and is sustained on two arms 12 which are secured to and extend transversely from the side members 1 and 2.

13 indicate brace members which are secured at one end to the handle portion of the side members and at the other end to the platform-supporting portion 3 thereof, said brace members being secured intermediate of their ends to the arms 12 of the barrel rest, as shown in Figs. 1 and 2. These brace members thus serve to brace the barrel rest as well as the truck structure, and the lower ends thereof also constitute positioning members to hold the barrel from movement transversely of the truck, it being noted that the lower ends of these brace members are situated either side of the barrel.

In the construction shown the curve of the runner portion 4 of the side members is such that the barrel-supporting portion 3 and the handle portion make an obtuse angle with each other so that when a barrel is resting on the platform, the upright or handle portion will incline away from the barrel slightly. This is clearly shown in Fig. 2.

In using the device a barrel is placed on the truck, as shown in the drawings, and if the barrel is to be transported over a level surface, the truck is trundled along on the truck wheels 9, as will be evident. The truck is especially designed so as to facilitate the transportation of a barrel, ash can or like receptacle up a flight of steps. In performing this operation the truck is drawn to the steps with the runner or shoe portion of the truck directed toward the step. When said runner or shoe portion engages the nose 14 of the lower step 15, then the truck will be slid up on the runner portion, as shown in Fig. 2, until the runner portion has passed over the nose into the position shown in Fig. 1. Since the wheels are journaled in the platform-supporting portion, this movement of the truck over the nose of the step will not be interfered with at all by the wheel. After the rounded portion of the shoe has passed over the nose 14 of the step, then said nose will strike the underside of the truck wheels 9, and by drawing upwardly on the handle 5, the truck will then roll over the nose 14 and along the top of said step 15 until the runner portion strikes the nose 16 of the next step 17 when the above operation will be repeated. This operation of drawing or sliding the truck over the noses or corners of the steps can be easily performed by the operator lifting or pulling on the handle 5.

The placing of the wheels under the platform-supporting portion is also an advantage in trundling the truck over a smooth surface, for when a barrel is supported by the truck and the truck is held in about the inclined position shown in Figs. 1 and 2, it can be either pushed or drawn along a smooth surface without danger of spilling the contents of the barrel, for the barrel has been held in a substantially vertical position.

We claim:

A barrel truck comprising two side members each being bent to form a straight body portion, a platform-supporting portion extending at an obtuse angle to the body portion and an intermediate curved portion connecting the body portion and platform-supporting portion and constituting a runner portion, a barrel support and positioning member carried by the platform-supporting portion with their axes in the plane of said portion, the axis of said wheels being located between a barrel supported on and positioned by the barrel-supporting portion and said runner portion, the size of the wheels being such that the peripheries thereof lie just inside the plane of the body portion and intersect the runner portion, whereby in taking the truck over a step the corner of the step will pass from the curved runner portion onto the wheels with an easy movement.

In testimony whereof, we have signed our names to this specification.

THOMAS E. JORDAN.
GERALD J. HENRY.